UNITED STATES PATENT OFFICE 1,931,016

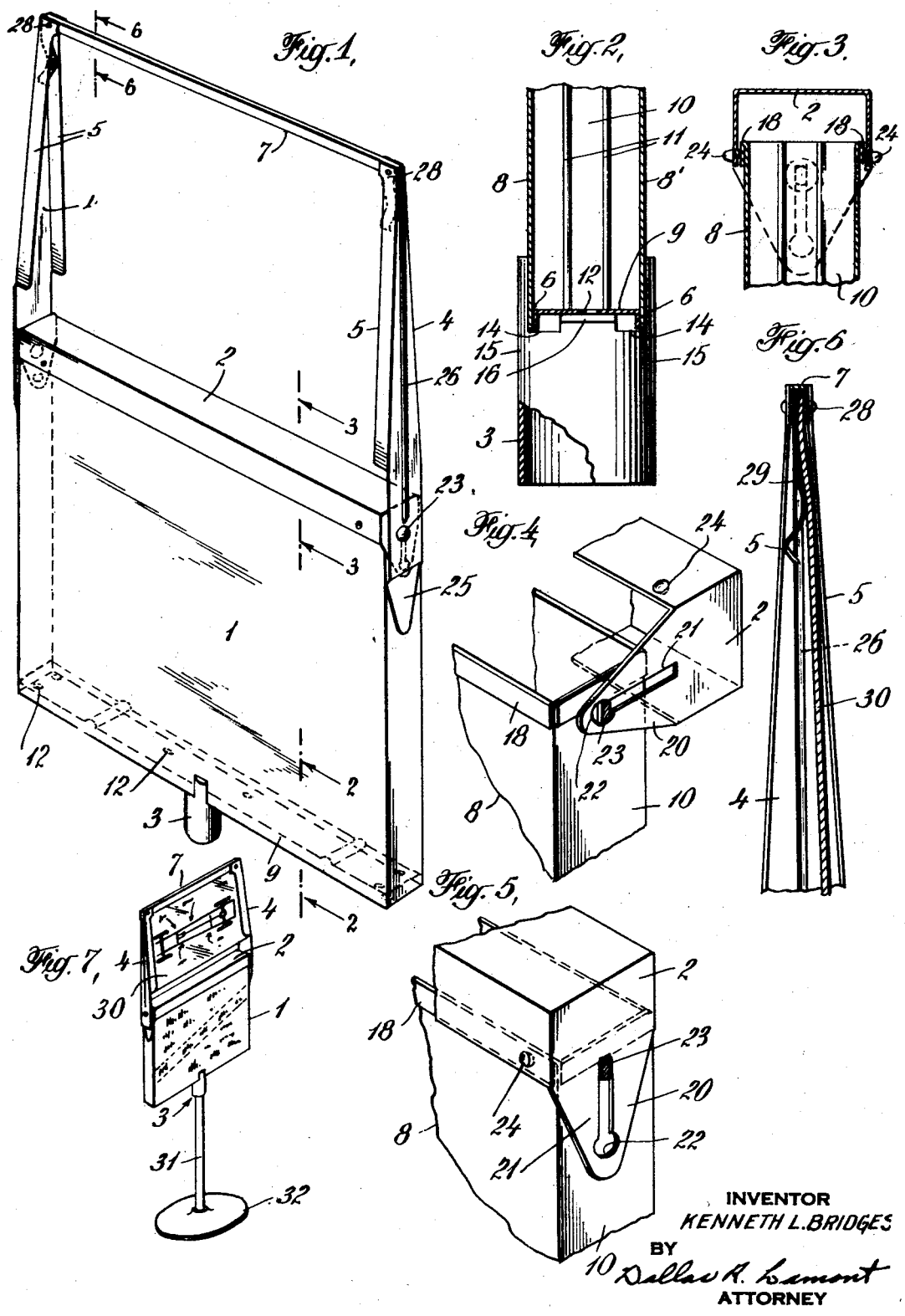

LUBRICATING CHART HOLDER AND DISPLAY APPARATUS

Kenneth L. Bridges, New York, N. Y., assignor to Socony-Vacuum Corporation, New York, N. Y., a corporation of New York Application February 11, 1933. Serial No. 656,299

10 Claims. (Cl. 40—125)

In the practice of lubricating automobiles, as for instance at service stations, there has grown up the practice of providing, for the reference of the workmen performing the lubrication service, charts showing the points to be lubricated upon automobiles of various makes and comprising directions as to the kind, quality, etc., of lubricant to be used at the various points. This invention has to do with apparatus for displaying and holding such charts.

According to the practice prior to this invention, these charts were supplied to the workmen either in the form of pages for a loose-leaf notebook or in the form of individual cards which might be consulted from time to time as the work progressed. One of the most common forms in which these charts have been supplied is that of the loose-leaf notebook. This furnishes a reference for the operator, but it must be handled as a book would be handled, the bulk of the notebook not readily permitting a vertical display of the instruction sheet. To obviate this difficulty to some extent it has been proposed to place this notebook upon a stand, somewhat of the nature of a dictionary stand, whereupon the instruction book lies in a fully open position. This stand is not only used to present the instructions to the operator but is used as a means of selling lubricating service by displaying the chart to the customer at the pump island or elsewhere about the service station. This device has serious disadvantages. The display is not in a form which can economically be made weatherproof. The open book of charts lies nearly horizontal in a position to readily receive rain and dirt. It is difficult to consult the chart without approaching closely and bending over it. The chart is not easily read from the seat of a customer's automobile. The charts soon become crumpled and torn from wear and wind.

Another form of making the lubrication information available for the operator which has been practiced is that of having individual cards which may be hung upon a wall or structure near the place where the operator is working. This is open to the objections that loose cards are easily lost or mislaid, they soon become torn and battered, and a card hung in a position accessible to the operator is not easily visible from the neighborhood of the pump island where the actual selling of the lubrication service is usually performed.

It is an object of this invention to provide means by which lubrication charts of the kind referred to are enabled to fulfill properly all of the functions of which they are capable. The manner of holding and displaying the charts according to the present invention embodies the following features: The chart is capable of being placed in a position where the operator can consult it without leaving his work; it may be placed in a position where the car owner or driver can consult it while the work is in progress, thus checking the work of the operator or gaining information for himself concerning the proper lubrication of his automobile; it can be so held that it can be seen readily by the driver without leaving the driver's seat. The device for displaying such instruction cards or charts, according to this invention, comprises a receptacle wherein those cards not in use are retained and protected from weather, dirt and loss. Also, the display device is of distinctive design and has a large surface whereon the products of the dealer may be advertised.

It is a further object of this invention to provide a combined container and display device for lubrication instruction charts which displays a single card in a substantially vertical position at a height and in a position readable both to a driver within an automobile and an operator working upon the same, which device also embodies means for retaining and protecting similar instruction cards not in use at the moment.

Further important objects of this invention are the provision of an apparatus which is readily portable, of a container which will afford a maximum of protection to the cards not in use, of a convenient means for selecting and displaying cards which is sufficiently rapid so that the salesman or operator on recognizing the make of car entering the driveway may have the chart applicable to that particular car displayed by the time the car comes to a stop, and of holding means whereby the cards may be held securely while in use without danger of flapping in the wind or tearing. The invention also provides further advantages in the details of structure and of use, which advantages will hereinafter appear.

In its preferred embodiment, the apparatus of the invention consists of a rectangular box of dimensions say approximately 2 feet in width, 1 foot 6 inches in height and 2 inches in depth from front to back, being adapted to hold instruction cards of the preferred size and shape. Attached to the ends of this box and extending upwardly therefrom are vertical members, say approximately 1 foot 6 inches in height, connected at their tops by a rigid bar or member. The box has a cover adapted for quick opening, and the whole device can be mounted upon a suitable standard at a convenient height. The cards or charts are normally contained within the box and, when a chart is removed from the box, it is raised vertically and supported in the frame formed by the two vertical side members and the rigid connecting member. A card thus displayed is in a position where it may be easily seen and readily consulted by the driver without leaving his seat, and the salesman or operator, by the quick presentation of the chart applicable to the particular automobile, is enabled to make his lubrication sales appeal immediately after performing the instant service which the driver has requested, the driver meanwhile having had time to consult the chart. During actual lubrication of the automobile, while the operator is working upon the car, the chart in this position will furnish him readily accessible instruction and will also enable the driver, if he wishes, to watch the progress of the work for his own information or for determining that the work is being done in accordance with the instructions. The cards not in use are in the meantime held within the container box, the vertical sides of which may be used either for permanent or temporary advertising display.

In order that the construction of the display device and container may be made clear, reference is now made to the drawing attached to and made a part of this specification. Figure 1 is an isometric view of the device as a whole; Figure 2 is a vertical sectional view of the box at the plane indicated at 2—2 in Figure 1; Figure 3 is a vertical sectional view of the upper edge and cover of the box taken on the plane indicated at line 3—3 in Figure 1; Figures 4 and 5 show the hinge device of the box cover, Figure 4 showing the cover in open position, and Figure 5 showing it in closed position; Figure 6 is a vertical sectional view taken on plane 6—6 indicated on Figure 1, a chart being in display position; and Figure 7 is a general overall view showing the appearance of the container and display device when in use. In the drawing, 1 is the container, 2 is the cover of the container, 3 is a stub pipe by which the container may be placed upon any suitable standard, 4 indicates the two vertical frame members comprising the side members of the display device and having attached to them guide vanes 5. The rigid member or bar connecting the tops of the vertical frame members 4 is indicated at 7, and it forms the top member of the display device.

Referring particularly to Figure 2, which shows details of construction at the bottom of the box, the box 1 is formed with two side plates 8 and 8'. Between these side plates is placed the bottom plate 9, the sides of which are bent down and secured to the side plates 8 and 8' by welding or other suitable means as indicated at 6. The end of the box is closed by a plate 10, to the interior surface of which are preferably fastened or formed small vertical ribs 11, these vertical ribs serving as guides to aid in holding the cards in a proper vertical position within the box. The opposite end of the box is similarly made.

Spaced along the bottom of the box at intervals in the bottom plate 9, as shown in Figures 1 and 2, drilled or punched holes 12 are provided which serve both to ventilate the box and to drain from it any water which may enter because of the cover being inadvertently left open or because of a card which has been exposed to the weather being returned to the box without wiping. Centrally located upon the bottom of the box 1 is a stub pipe 3, welded or otherwise suitably secured at its upper end to the box 1 and open at its bottom end and of sufficient length to afford stability for the container to which it is attached when it is slipped over a vertical pipe or rod standard member 31.

Referring now particularly to Figure 3, the side walls of the box, indicated by 8 and 8', are reversely bent upon themselves, say for a distance of approximately ⅜ of an inch to form rigid lips as indicated at 18. Placed over the box thus formed is the cover 2, which may preferably be of a metal somewhat greater in thickness than the body of the box and which is so dimensioned that it yields a moderately close fit to the rim 18, yet is not sufficiently close to allow any great amount of friction.

Referring now particularly to Figures 4 and 5, in which figures the side posts 4 of the display device are omitted for the sake of clearness, the cover 2 is seen to be provided at its respective ends with downwardly extending lugs or tabs 20. In both of these tabs 20 there is cut a vertical slot 21 terminating at its lower end in a circular orifice 22, the diameter of such orifice being greater than the width of the slot 21. Extending through slot 21 and serving to attach the cover 2 to the end wall 10 of the box 1 is a rivet 23. The portion of the shank of this rivet positioned in slot 21 is oval in cross section, as shown particularly in Figure 5, having a horizontal dimension slightly less than the width of the slot 21 and a vertical dimension greater than the slot 21 and slightly less than the diameter of the circular orifice 22. The result of this connection is that, in order to open the box, the cover 2 must first be raised vertically from the closed position of Figure 5 a distance equal to the length of the slot 21, which causes it to fully clear the top rim 18 of the container, after which it may be swung to either side, completely removing it from a position obstructing the opening of the box, as shown in Figure 4. To prevent the cover, when thus swung away from the box, from cutting, scratching or injuring the paint or advertising display upon the side of the box, bumpers 24 are provided in the shape of small lugs or buttons placed upon the cover 2 in such position, as shown, that only they will touch the side of the box when the cover is swung back.

Referring again to Figure 1, the vertical frame members of the display device are steel members attached by welding or other suitable means to the end of the box 1 below the cover hinge, as indicated at 25, and assisted in rigidity by the cover hinge rivet 23 which extends through the frame members 4 as well as through the end wall 10 of the box 1. At a point some distance above the top of the box 1, the sheet metal of which these vertical frame members 4 is formed is extended into two guide vanes 5, one on either side of each frame member 4 as shown. These guide vanes 5 are preferably made approximately 1 inch wide, and in the preferred embodiment here shown they extend from a point 2 inches or so above the top of the box 1 to the upper extremity of the frame members 4. Each frame member 4 is formed with a reinforcing rib 26 extending throughout the greater portion of its length upon its outer side. These frame members 4, together with their guide vanes 5, form a pair of channels which at the bottom are of the full width of the box and which taper upwardly to a width of say ¼ inch, at which point they are joined to the upper rigid connecting member 7. A card or chart may be withdrawn from the uncovered box 1 and pulled vertically upward between these guide vanes to a display position, and the frame members 4, together with member 7 assisted by guide vanes 5, form a rigid frame for its support.

Referring to Figure 6, 4 is the end frame member with its stiffening rib 26, and 5 indicates the two guide vanes provided on member 4. The rigid member 7 is formed of a strip of metal bent in an inverted U shape and fastened to the extremity of frame members 4 by a rivet 28. Secured within the guide vanes 5 by the same fastening means, or by other means if desired, is a flat spring 29 so shaped that a card 30 may be inserted between the spring 29 and either of the guide vanes 5 and may thereafter be held in place by the pressure of the spring, as shown.

Referring to Figure 7, the stub pipe 3 has been slipped over a smaller pipe 31 of suitable length extending upwardly from a cast iron base 32. In this figure, a card is shown in the display rack, and the manner in which the side of the box may be used for advertising display is also indicated.

In use, the box, stocked with a sufficient number of cards to cover the makes of automobiles most frequently serviced, may be placed near the pump island, or elsewhere in the service station as desired, and the cards therein selected and placed for display as previously indicated.

While the description and illustration given herein disclose the container and display device in its present preferred form, it is understood that the invention contemplates equivalent forms of apparatus in so far as permitted by the following claims.

I claim:

1. A holder and display apparatus for lubrication charts which comprises a box for normally holding said charts, concealing them from view and protecting them from weather, an opening provided in said box through which charts may be withdrawn from within said box, a frame attached to said box for receiving a chart withdrawn therefrom and supporting said chart in display position, holding means provided on said frame engaging the chart near its periphery and holding it in display position within said frame, and additional guard members extending along the periphery of said chart for further restricting uncontrolled movement of said chart while mounted in display position.

2. A lubrication chart holder and display apparatus of the class described which comprises a box normally containing a plurality of said charts in concealed and protected position, an opening provided in said box through which charts may be withdrawn from within the box, a display frame attached to said box and lying substantially in the normal path of movement of a chart being withdrawn from said box, so that withdrawal of a chart from the box also at the same time effects introduction of the chart into the said display frame, guide members provided on said frame for engaging the two sides of the chart which extend parallel to the direction of movement of the chart during its withdrawal from the box, said guides serving to guide the chart into position within the display frame and to hold said chart against excessive movement when in display position, and additional holding means for engaging the chart near its periphery when in display position to hold said chart in such position until it is manually removed.

3. A lubrication chart holder and display apparatus of the class described which comprises a box normally containing a plurality of said charts in concealed and protected position, an opening provided in said box through which charts may be withdrawn from within the box, a display frame attached to said box and lying substantially in the normal path of movement of a chart being withdrawn from said box, so that withdrawal of a chart from the box also at the same time effects introduction of the chart into the said display frame, guide members provided on said frame for engaging the two sides of the chart which extend parallel to the direction of movement of the chart during its withdrawal from the box, said guides serving to guide the chart into position within the display frame and to hold said chart against excessive movement when in display position, additional holding means for engaging the chart near its periphery when in display position to hold said chart in such position until it is manually removed, and a member constituting a part of said display frame remote from and opposed to the opening in said box and positioned to act as a stop limiting the travel of said chart and comprising a recess wherein the forward edge of said chart may be received and supported.

4. A device for displaying information-bearing cards comprising a box adapted to hold a supply of said cards, said box having an opening through which cards may be withdrawn in an edgewise manner, a frame consisting of side members attached to said box and an end member, said frame having a form adapted to receive and support said cards when so withdrawn and lying in the normal path of travel of cards when withdrawn from said opening, each side member of said frame having guide flanges extending into proximity with said opening, said flanges approaching each other at the end remote from said opening, whereby a card being removed from the box in a plane substantially parallel with that which it assumed in said box is readily introduced between said guide flanges and conducted to its final position, and additional engaging means to secure the card in its final position within said frame until manually removed.

5. A device for displaying information-bearing cards comprising a box adapted to hold a supply of said cards, said box having an opening through which cards may be withdrawn in an edgewise manner, a frame consisting of side members attached to said box and an end member, said frame having a form adapted to receive and support said cards when so withdrawn and lying in the normal path of travel of cards when withdrawn from said opening, each side member of said frame having guide flanges extending into proximity with said opening, said flanges approaching each other at the end remote from said opening and being spaced apart at their opposite ends a distance substantially equal to the width of said opening, whereby a card being removed from the box in a plane substantially parallel with that which it assumed in said box is readily introduced between said guide flanges and conducted to its final position, and a removable cover adapted to close said opening in said box.

6. A holder and display apparatus for lubrication charts which comprises a closed box for housing and concealing from view a plurality of said charts and protecting said charts from the weather while holding said charts in a substantially vertical position, an opening in said box through which charts may be withdrawn from within said box, a cover normally closing said opening and thereby shielding the interior of said box and the charts therein, means whereby said cover may be moved respectively to cover and uncover said opening, a framework extending substantially vertically above said opening for holding and displaying a chart withdrawn from said box, each side member of said frame having guide flanges extending into proximity with said opening, said flanges approaching each other at the end remote from said opening and being spaced apart at the end adjacent said opening, whereby a card being removed from the box in a plane substantially parallel with that which it assumed in said box is readily introduced between said spaced guide flanges and conducted and guided into its final position, and additional engaging means to secure the card in its final position within said frame until manually removed.

7. A holder and display apparatus for lubrication charts which comprises a closed box for housing and concealing from view a plurality of said charts and protecting said charts from the weather while holding said charts in a substantially vertical position, an opening in said box through which charts may be withdrawn from within said box, a cover normally closing said opening and thereby shielding the interior of said box and the charts therein, means whereby said cover may be moved respectively to cover and uncover said opening, a frame extending substantially vertically above said opening for holding and displaying a chart withdrawn from said box, each side member of said frame having guide flanges extending into proximity with said opening, said flanges approaching each other at the end remote from said opening and being spaced apart a distance substantially equal to the width of said opening at the end adjacent said opening, whereby a card being removed from the box in a plane substantially parallel with that which it assumed in said box is readily introduced between said guide flanges and conducted to its final position, and additional engaging means to secure the card in its final position within said frame until manually removed.

8. A holder and display apparatus for lubrication charts which comprises a closed box for housing and concealing from view a plurality of said charts and protecting said charts from the weather while holding said charts in a substantially vertical position, an opening in said box through which charts may be withdrawn from within said box, a cover normally closing said opening and thereby shielding the interior of said box and the charts therein, means whereby said cover may be moved respectively to cover and uncover said opening, a framework extending substantially vertically above said opening for holding and displaying a chart withdrawn from said box, each side member of said frame having guide flanges extending into proximity with said opening, said flanges approaching each other at the end remote from said opening and being spaced apart at the end adjacent said opening, whereby a card being removed from the box in a plane substantially parallel with that which it assumed in said box is readily introduced between said spaced guide flanges and conducted and guided into its final position, and additional engaging means to secure the card in its final position within said frame until manually removed, comprising springs lying within the said respective guide flanges upon each side member adjacent the ends thereof remote from the said box, said springs being secured at their respective remote ends and extending toward the box opening in a double curve, whereby each spring may exert pressure simultaneously upon both of its respective confining guide flanges.

9. A device for displaying information-bearing cards comprising a box adapted to receive and protect a supply of said cards, means therein to maintain such cards in a spaced apart and substantially vertically upright position, said box having an open upper face through which said cards may be withdrawn and returned, a cap type of cover for said open face, means for confining the travel of said cover during removal to a substantially vertical path until clear of the box and thereafter permitting said cover to be swung to either side in an arc to uncover said opening, and a frame attached to said box and extending substantially vertically above said opening adapted to receive and hold said cards in a display position.

10. A device for displaying information-bearing cards comprising a box adapted to receive and protect a supply of said cards, means therein to maintain said cards in a spaced apart and substantially vertically upright position, means in the bottom face of said box permitting ventilation and drainage of moisture from its interior, said box having an open upper face through which said cards may be withdrawn and returned, a cap-like cover for said open face, means for confining the travel of said cover during removal to a substantially vertical path until clear of the box and thereafter permitting said cover to be swung to either side in an arc to uncover said opening, a frame composed of side and end members, attached to said box and extending substantially vertically upward in the normal path of travel of said cards when withdrawn through said opening, each side member of said frame having guide flanges extending into proximity with said opening, said flanges approaching each other at the end remote from said opening, whereby a card being removed from the box is readily introduced between said guide flanges and conducted to its final position, said end frame member remote from and opposed to said opening being positioned to act as a stop limiting the travel of said card and forming an elongated recess wherein the forward edge of said card may be received and supported, engaging springs lying within the guide flanges upon each side member adjacent the end remote from said box, said springs being secured at their respective remote ends and extending toward said box in a double curve, whereby each spring exerts pressure simultaneously upon both of its respective confining guide flanges and a card introduced upon either side of said spring is thereby secured until manually removed, and means for supporting said box at a convenient height.

KENNETH L. BRIDGES.